April 2, 1946. E. A. ERNST Re. 22,740

SACK JIGGER

Original Filed April 13, 1942 2 Sheets-Sheet 1

INVENTOR.
EARL A. ERNST
BY
Earl A. Moore
ATTORNEY.

April 2, 1946. E. A. ERNST Re. 22,740

SACK JIGGER

Original Filed April 13, 1942 2 Sheets-Sheet 2

INVENTOR.
EARL A. ERNST
BY
Earl E. Moore
ATTORNEY.

Reissued Apr. 2, 1946 Re. 22,740

UNITED STATES PATENT OFFICE 22,740

SACK JIGGER

Earl A. Ernst, Bakersfield, Calif.

Original No. 2,347,474, dated April 25, 1944, Serial No. 438,705, April 13, 1942. Application for reissue December 30, 1944, Serial No. 570,567

3 Claims. (Cl. 259—72)

This invention relates to a device for shaking and jiggling sacks and their contents so as to settle the contents to the bottom of the sack and compact them. Means are provided for supporting the sacks in open position and means are also provided for continuously jarring the sacks while being loaded so as to insure a full sack of the product being bagged. The invention is especially useful in machine sacking of potatoes and other vegetables, and particularly those vegetables and/or fruits which are generally shipped in long configurated sacks. Unless the sacks are uniformly loaded, their weights would obviously vary and, therefore, a truck load or group of so many twenty-five, fifty or one hundred pound sacks would not represent any true weight of a shipment.

One of the principal objects of this invention is to present a means for sacking vegetables and/or fruits wherein the sack is firmly supported in open position and continuously jiggled so as to allow complete filling of the sack with any commodity.

Other objects, advantages and features of my invention will appear from the accompanying drawings, the subjoined detailed description, the preamble of this specification, and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

Figures 1, 2:
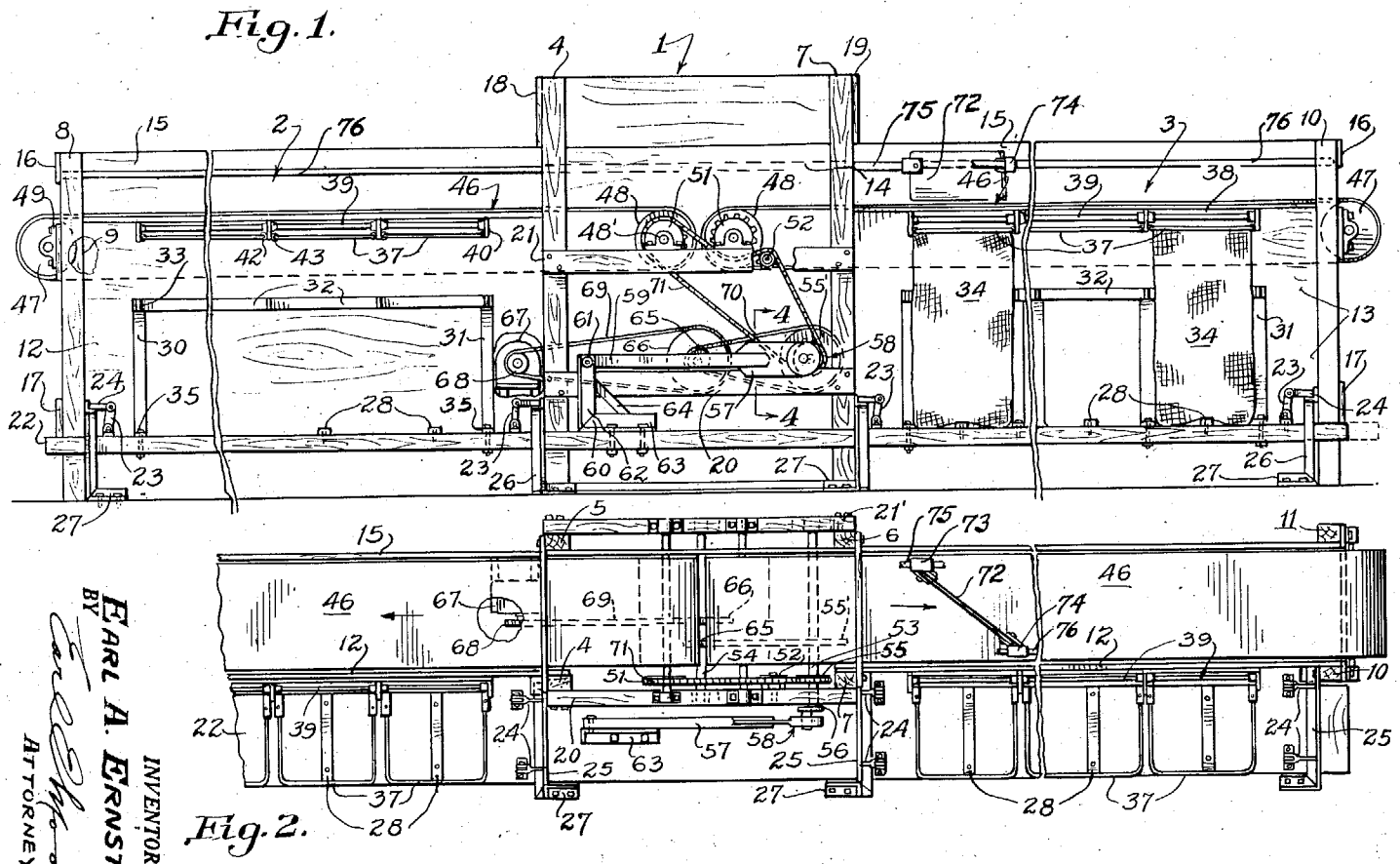
Fig. 1 shows the invention in side elevation.
Fig. 2 is a plan view of the invention.
Figure 3:
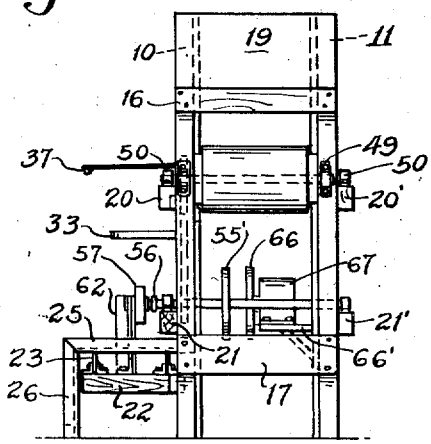
Fig. 3 is an end view.
Figure 4:
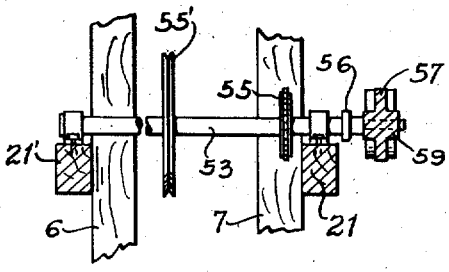
Fig. 4 is a sectional view taken substantially along the line 4—4 of Fig. 1.

The sacking device in the particular form illustrated comprises a central portion 1 and elongated side portions or extensions 2 and 3. These side portions may be identical in construction and are identical in this form of the invention, but need not necessarily be identical. One of the side portions may be omitted entirely. The general structural members and frame for the device are shown as comprising a plurality of vertical wooden posts 4, 5, 6 and 7 which support the central frame unit 1 and the near ends of the side portions 2 and 3. The distal end of the side portion 2 is supported by the posts 8 and 9, and the distal end of the other side portion is supported by the posts 10 and 11 as shown. The front face of side portion 2 is covered by plyboard or heavy planks 12 and the front face of the other side portion 3 is covered by plyboard or the heavy planks 13. Across the front face of the central portion 1 are the planks 14. All these planks are securely nailed or bolted to the rear side of the various posts. Along the rear of the device near the top thereof is a continuous single plank 15 which is nailed to the posts 9, 5, 6 and 11. To give lateral stability, each end of the device has the cross end planks 16 and 17 nailed to their respective posts; at the central portion are the cross planks 18 and 19 as shown.

For supporting various shafts etc., the front of the central portion has the spaced horizontal members 20 and 21 which are nailed to the posts 4 and 7 and at the rear similar horizontal members nailed to the posts 5 and 6.

At the lower front of the device is a platform 22 which extends along the entire length of the device and preferably very heavy planking to withstand bending stresses. This platform may be a single plank or made up from a number of narrow planks. This platform is supported in a manner to allow it to be vibrated or jiggled longitudinally. At the ends and near the center of the platform are pivotally connected pairs of hanger means or straps 23, the tops of which are pivoted to extension elements 24, and their bottoms to the top of the platform. These extensions are supported by angle irons which have top horizontal bars 25, vertical struts 26 and feet portions 27 which are bolted or screwed to a platform or to the floor of the building. The free ends of the horizontal bars are bolted to their respective upright posts. Cleats 28 are provided on the top surface of the platform to present a plurality of areas for the bottoms of the sacks to be loaded. These cleats also strengthen the platform and tend to reduce the likelihood of warping.

A frame is provided on each right and left portion of the device to move with the platform. Each one of these frames consists of end vertical posts 30 and 31 joined at their tops to a horizontal beam 32 from which protrude a plurality of spaced apart separators or beaters 33. These beaters extend between the bags or sacks, when in place, such as the sacks indicated at 34. Small feet 35 are formed at the bottom of the posts 30 and 31 so that they can be securely bolted to the top of the platform 22. When the platform is jiggled to shake the bottoms of the sacks, the beaters 33 shake the middle portions of the sacks.

Figure 7:
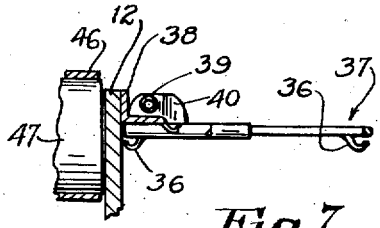
Fig. 7 is a sectional view taken substantially along the line 7—7 of Fig. 6.
Figure 5:
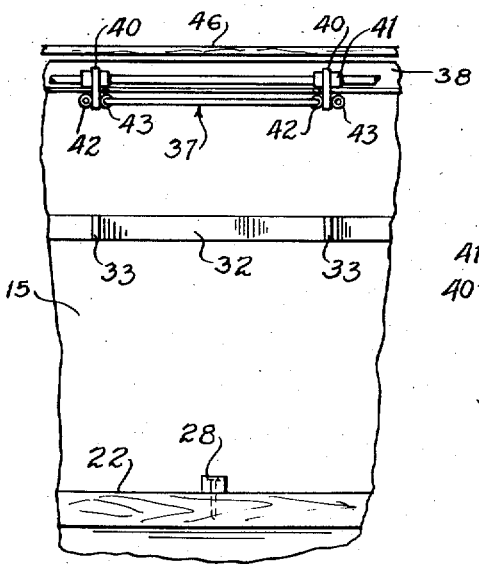
Fig. 5 is an elevational view of a portion of the invention, enlarged.
Figure 6:
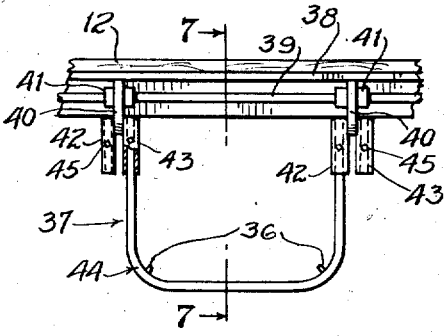
Fig. 6 is a plan view of the top portion of Fig. 5.

The tops of the sacks are hung onto spaced apart hooks 36, see Figs. 6 and 7, which are fixed to the inner periphery of the sack spreader loops in the frame unit 37. Each one of these units consists of an angle iron 38 that is bolted to the top edge of the upper plank 12. Within the angle is an elongated rod or pipe 39 supported at its ends in any suitable manner or bracket so as to hold the pipe spaced from the legs of the angle iron 38. Spaced at intervals along the pipe are a plurality of pivot elements 40 which have integral sleeves 41 surrounding the pipe. These elements have under sections that engage the upper face of the horizontal legs of the angle iron 38 so as to limit the downward movement of the elements 40. To the bottoms of the elements 40, on each side thereof, are welded the tubes or pipes 42 and 43, the bores of which receive the ends of a removable U-frame 44. This U-frame is adjustable for accommodating itself for sacks having different sized openings. The set screws 45 hold the U-frames in adjusted position.

Each right and left section or portion of the device have an endless belt 46 which are rotatably supported at their ends by the revolvable cylinders or drums 47 and 48. These cylinders have shafts which are journalled in brackets 49 that are fixed to the end posts as shown. The inner opposed cylinders 48 have shafts 48' that are journalled in bearings 50 upon the top of the horizontal timber members 20 and 20'. Near one end of each of the shafts 48' is keyed the sprocket wheel 51 and journalled to the inner side of the member 20 is a small idler sprocket wheel 52. Journalled on the tops of the timber members 21 and 21' are the spaced apart shafts 53 and 54. To the shaft 53 is keyed a sprocket wheel 55; this shaft has an extension or eccentric shaft (crank end) 56 journalled in the plate 57 of a push and pull rod unit or jigger 58. This unit has fixed to the plate 57 a bar 59 which has its other end pivoted to the top of a bracket 60 at 61. This bracket consists of a frame having the two angle iron legs 62 and 63 welded together and the corner brace 64. The leg 63 is securely bolted to the platform 22.

Keyed to the shaft 54 is a small sprocket wheel 65 and also a V-cut pulley wheel 66 which is larger in diameter than the sprocket wheel 65. Supported by a bracket framework 66' is an electric motor 67 to the shaft of which is keyed a small V-cut pulley wheel 68. Any suitable electric power is supplied to the motor, and a convenient switch provided to start and stop the motor (not shown). The motor pulley and pulley 66 are connected by the endless V-type belt 69 and the sprocket wheels 65 and 55' are connected by the endless chain 70. The sprocket wheels 55, 52 and 51 are all connected together by the endless chain 71 as shown.

From the foregoing specification, it is now obvious that when the electric motor is supplied with electric power, its speed is mechanically reduced to suit the running speed of the endless belts as well as the required vibratory speed of the jigger apparatus 57. The degree of vibration will depend upon the amount of spacing between the shafts 53 and 56, and the rate of vibration upon the pulley wheel and sprocket wheel ratios.

In order to cause the articles upon the belts 46 to be moved laterally into the various sacks 34, a diagonally baffle plate or shearer 72 is provided. The ends of each plate has fixed thereto the sleeves 73 and 74 which slide on their respective side rails or pipes 75 and 76. These plates 72 can readily be manually shifted over the belts 46 and properly positioned to force articles upon the moving belts into any one of the sacks 34.

Having thus described my invention, what is claimed as new and desired to be secured by Letters Patent is:

1. In a device for shaking containers and the like to settle the contents thereof, a framework, a platform for supporting a plurality of containers, hinged means supporting the platform from the framework, vibratory means connected to the platform for shaking it and the containers supported thereby, said means including a pitman adjacent the platform, coupling means connecting the pitman with a portion of the platform, and rotary means attached to the pitman for reciprocating it, said platform including an elongated surface with container stations from the ends thereof to a central open locus, said vibratory means having its connection with the platform at this central locus.

2. The device recited in claim 1 wherein the platform is provided with an elevated frame at each end portion thereof, bar means supported by the frames designed to give lateral support to the containers at a level above the surface of the platform.

3. In a device for shaking containers for settling the contents thereof, a framework having a plurality of elevated container holding means supported thereby along a side thereof, an elongated platform beneath the holding means and adjacent the bottom of the framework for giving subjacent support for containers in the elevated holding means, means depending from portions of the frame for supporting the platform so that the platform can be vibrated, a framework having extending arms intermediate the container holding means and the platform for striking containers supported in the holding means intermediate their tops and bottoms, vibratory means connected to the platform for jiggling it and any containers in contact therewith.

EARL A. ERNST.